United States Patent Office 2,974,925
Patented Mar. 14, 1961

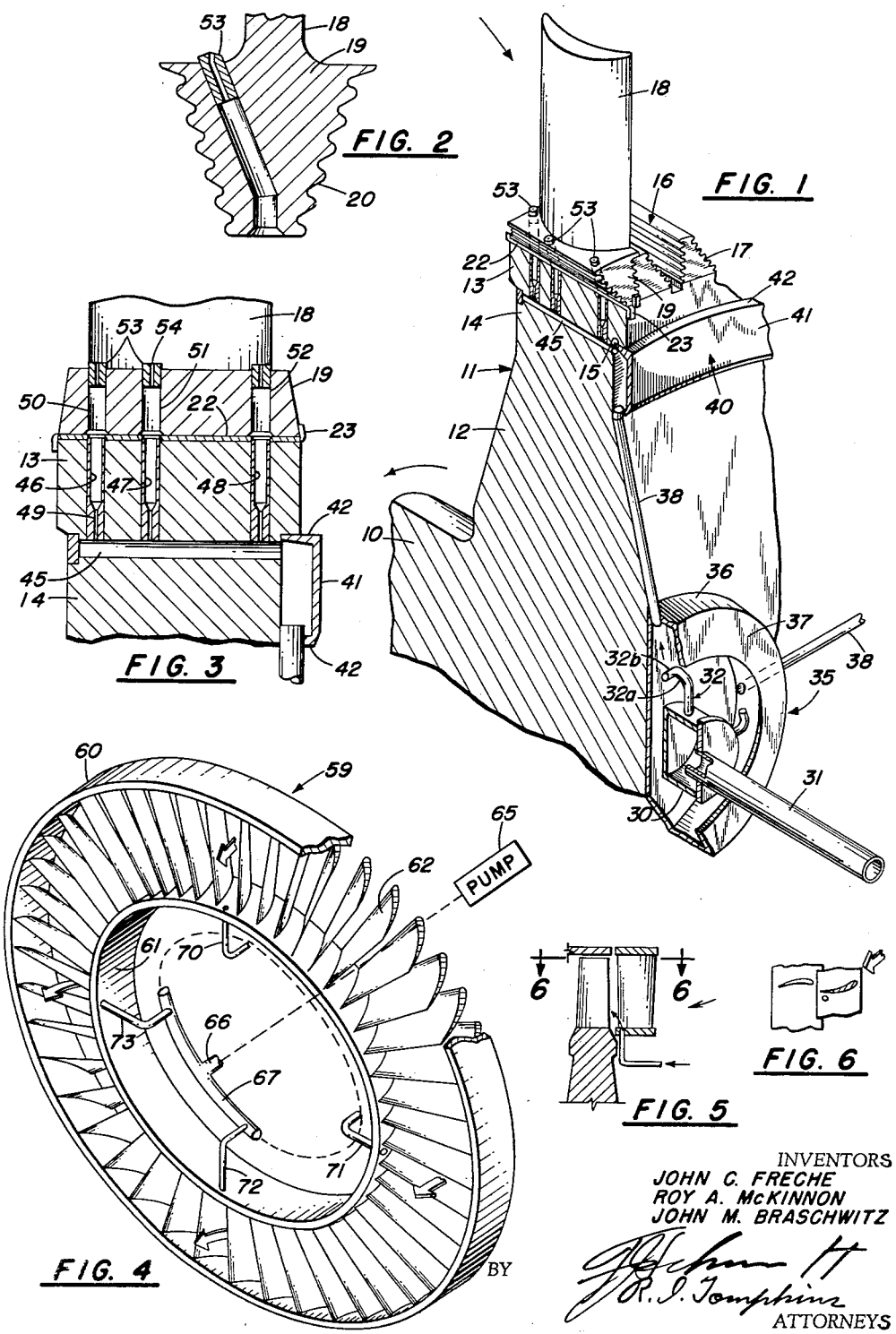

2,974,925
EXTERNAL LIQUID-SPRAY COOLING OF TURBINE BLADES

John C. Freche, Fairview Park, and Roy A. McKinnon and John M. Braschwitz, Cleveland, Ohio, assignors, by mesne assignments, to the United States of America as represented by the Administrator of the National Aeronautics and Space Administration Filed Feb. 11, 1957, Ser. No. 639,589

7 Claims. (Cl. 253—39.15)

(Granted under Title 35, U.S. Code (1952), sec. 266)

The invention described herein may be manufactured and used by or for the Government of the United States of America for governmental purposes without the payment of any royalties thereon or therefor.

This invention relates to the cooling of rotating blades subject to heated gas flow, such as gas turbine blades. Particularly in gas turbines, which are subject to high temperature gas flow, it is important that cooling means be provided for the turbine blades which will prevent metal deterioration and at the same time offer only limited interference with the aerodynamics of gas flow. In the copending application of John C. Freche, Serial No. 529,594, filed August 19, 1955, now Patent No. 2,956,772, cooling apparatus is described in which free flowing spray tubes spaced around the inner support ring of the turbine stator supply cooling spray to the rotor blades, and this apparatus has been found adequate for normal cooling. However, in the case of larger sized turbine blades exceeding around 4 inch span and 2 inch chord, it is sometimes difficult to cool the blade tip adequately with stator coolant flow only.

It is accordingly an important object of this invention to provide blade cooling means for gas turbines and the like which is effective for cooling the entire blade area, irrespective of the blade dimensions.

An object, also, is to provide novel apparatus for cooling gas turbine blades which is adequate for cooling blades of reduced dimensions.

Other objects pertain to simplification of the cooling apparatus including elimination of cooling ducts in the blade and elimination of spray bars which interfere with turbine gas flow and may develop failure of flow with consequent blade damage.

Other objects and many of the attendant advantages of this invention will be readily appreciated as the same becomes better understood by reference to the following detailed description when considered in connection with the accompanying drawings wherein:

Fig. 1 is a view in sectional perspective of a turbine rotor or hub with an attached blade;

Fig. 2 is a view of the blade root;

Fig. 3 is a detail view through the rotor rim showing the coolant ducts;

Fig. 4 is a perspective view of the turbine stator;

Fig. 5 is a detail view showing the relationship of the turbine stator and rotor blading; and Fig. 6 is a sectional view along lines 6—6 of Fig. 5.

Referring to Fig. 1 there is shown, by way of example, part of a gas turbine structure, including the rotor shaft 10 terminating in a massive hub 11 projecting radially from the shaft axis. As shown, the hub has three sections, a tapered wall section 12, a rim section 13, and a connecting section 14 between the tapered and rim section, the connecting section having parallel walls forming, with the wider rim 13, an inset surface with outer projecting edges 15. The hub rim 13 is formed with a continuous series of transverse recesses 16, each of which is broadly V-shaped but having the side wall formed with adjacent secondary transverse grooves 17. The blades 18 have the usual airfoil shape with rounded leading edges and thin trailing edges and curved profiles, as indicated in Fig. 6. The blade root 19 (Fig. 2) is in the form of a triangular elongated block with the blade integral with one side and the two other sides having adjacent transverse grooves 20 therein, these grooves conforming to and adapted to register with the grooves 17 of the rim recesses 16, this forming the well-known fir-tree base connection. Attachment is made by sliding the blade root into the rim recess from the hub side, so that the grooves and ridges of the two parts are in cooperative engagement. This engagement is maintained by a metal strap 22 extending transversely between apexes of the mating triangular rim and blade structures, the strap having split ends 23 protruding on either side of the rim and reversely turned 90 degrees to prevent side movement of the blade. Preferably, to give room for the locking strap 22, the terminal apex of the blade root is removed, as appears from Fig. 2.

Having described the basic rotor structure, consideration will now be given to the cooling apparatus.

The underlying consideration in the development of the effective cooling arrangement now to be described was to obtain a liquid spray of coolant in such relation to the rotor blade as to obtain adquate blade coverage, and to accomplish this result without complicated coolant flow connections between the rotor and source of coolant supply. To this end, use is made of a stationary coolant supply manifold chamber 30 of cylindrical shape with the cylinder axis in line with the axis of rotor shaft 10 and attached hub 11. The outer end of this manifold is apertured to receive pipe 31 which connects to the coolant supply, water being a desirable coolant because of its cheapness and high heat of vaporization.

Extending radially from the hub end of the cylindrical wall of the manifold is a group of nozzle tubes 32, four being used in the arrangement of Fig. 1, spaced at 90 degree intervals around the manifold. Each of these tubes 32, moving out from the manifold, has an initial radial section and a terminal curved section, the open end of the tube being tapered to a constricted nozzle outlet and the terminal curvature being double, toward the rotor hub at an agle of about 20 degrees with the plane of rotation and, terminally, in the direction of rotation to permit tangential coolant entry into the gutter, as indicated respectively by numerals 32a and 32b of Fig. 1. Overlying the nozzles is a rotatable receptacle or gutter 35 fixed to the rotor hub. This gutter consists of an annular plate 36, concentric with the shaft and supply manifold axis, and an outer guard flange plate 37 lying in a plane roughly perpendicular to said axis, thus forming a temporary receptacle for fluid emanations from the nozzles.

Leading from gutter 35 are radial tubes 38, spaced around the gutter at angular distances of about 90 degrees to constitute a group of four tubes. Each of these tubes 38 terminates in a rim manifold 40 formed by fixing, by any suitable means, an annular plate 41 having projecting inner and outer edge flanges 42 to the side of the turbine hub section 14 opposite to the hub shaft, the flanges resting on the hub surface with the outer flange closely beneath the projecting rim ledge 15. In this manner a flat coolant supply chamber is formed adjacent the rim, extending completely around the rotor in the rim area.

Prior to attachment of the rim manifold 40 to the rotor, coolant ducts 45 are drilled through the hub section 14, just beneath the rim, these ducts being parallel to the shaft axis, and located directly beneath the apex of the triangular rim recess. At selected points along these ducts, radial connecting ducts are formed, into which plugs 46, 47 and 48 (Fig. 3) are fitted. These plugs are hollow lengthwise, each having a narrow inlet bore 49 and a larger outlet bore, a diameter of about 0.015 inch for the inlet bore being found to provide a satisfactory non-clogging flow orifice. As is apparent from Fig. 3, openings in the fir-tree attachment strap 22 are provided to receive the projecting ends of plugs 46, 47 and 48.

Ducts 50, 51 and 52 are provided in the blade root in continuation of the plugs 46, 47 and 48, these blade ducts being placed on the suction side of each blade and being each provided with an outlet plug 53 having a constricted bore 54, with a diameter of about 0.030 inch to form an injection orifice for flow of coolant to the blade area. The base end of ducts 50, 51 and 52 are countersunk to minimize the possibility of leakage due to misalinement between the flow passage in the rotor rim and those in the blade root.

The operation of the cooling arrangement as above described follows. Coincident with rotation of the turbine rotor coolant fluid flows through inlet pipe 31 into the stationary supply manifold and is forced out into the annular gutter 35 through nozzles 32. Centrifugal force is operative in the gutter 35 to retain the coolant from spillage and force it outwardly through tubes 38 to the rim manifold 41 and thence to the transverse ducts 45 and the radial ducts 46, 47, 48 and 50, 51 and 52 to the suction side of the blades, where, in spray form, it cools the blade surfaces.

The cooling system as above described may be used satisfactorily with certain types of turbine blades. However, the described system has been found particularly useful and effective when combined with the stator cooling system as described in the copending application hereinabove referred to and illustrated in Figs. 4, 5 and 6 of the accompanying drawings.

In the cooling arrangement of Figs. 4, 5 and 6, the coolant is supplied to the rotor blades of the turbine by way of the turbine stator 59, as shown in Fig. 4. This stator, which is mounted on the shaft side of the rotor with the face illustrated in the figure adjacent the rotor in Fig. 1, consists of two concentric rings 60 and 61 between which the stator blades 62 are mounted with their ends affixed to the rings. These blades are of the usual airfoil construction, the profile being such as to properly direct gas flow into the rotor blade channels.

Coolant is supplied to the stator from the source by way of a pump 65, a pipe line 66, and a circular manifold 67, which may be included within the space bounded by the inner stator ring 61. Four taps are indicated in Fig. 4, as taken from said manifold, these taps consisting of tubes 70, 71, 72 and 73 and each tube extending from the manifold to and through the adjacent inner ring 61 and terminating flush with the inner ring surface. The nozzles or orifices of these tubes are not the same, those of tubes 70 and 71, for example, being of different diameter in the values of 0.078 inch and 0.135. The reason for this divergence of size is to insure steps of penetration of the coolant flow into the gas stream of the stator blade space, this following from the fact that the degree of penetration of the jet stream into the gas flow depends on the momentum of the jet, that is, the mass times the velocity, and since the velocity through both orifices is the same, the penetration varies with the mass of fluid, or orifice cross-section. Alternate orifices may be of equal dimensions so that two steps of penetration exist. However, orifice size may be altered in any desired sequence.

It is pointed out that, as indicated by the arrows in Figs. 4 and 5, the coolant orifices are on the downstream side of the gas flow through the stator so that the coolant sustains a minimum of evaporation prior to impingement on the rotor blades, as indicated in Fig. 5.

In operation of this stator type apparatus, coolant, step-sprayed into the stator space, is swept by the gas stream into the rotor space where it extracts heat from the rotor blades, particularly at the root and midspan areas, with appreciable temperature reduction at the blade tip. When both stator and rotor cooling apparatus are combined, however, not only is the entire blade held at moderate temperatures but blade sizes in excess of 4 inch span and 2 inch chord are also effectively cooled. Thus, by combining the specific stator and rotor cooling apparatus as described, not only is substantially uniform blade cooling achieved for varied size turbines, but also it becomes possible to locate the place of cooling by the position of the injection orifices at the rotor blade base and to regulate the degree of cooling by the dimensions of the flow control orifices.

It is pointed out that the specific structures described are by way of example, as various constructions may be used. For example, the passages through the rotor blade base may be cast or drilled, the injection orifices may be welded or brazed into place and blades may be pinned or welded into position rather than employing the locking straps shown. Also, while water is indicated as a desirable coolant, any readily available liquid may be used. For example, in a jet engine a liquid fuel may be used as the coolant, the coolant spray, after absorbing heat from the turbine blades, being burned downstream of the blades for thrust augmentation. Thus, modifications and variations of the present invention are possible in the light of the above teachings. It is therefore to be understood that within the scope of the appended claims the invention may be practiced otherwise than as specifically described.

What is claimed is:

1. In a gas turbine having a shaft, a hub on said shaft having a rim; blades having blade roots mounted on said rim; cooling apparatus for said blades comprising means for providing a temporary receptacle for coolant adjacent and attached to the hub near the hub axis, said receptacle being in the form of an annular gutter having a closed radially outer side and an open inner side; coolant supply ducts in the blade root on the convex side only of each blade; radial injection orifices for each of said ducts; connection means between said receptacle and said radial ducts; said connection means terminating in and penetrating said closed outer gutter; means for supplying coolant to said receptacle, said supply means comprising a stationary manifold chamber concentrically positioned within the area determined by the open inner side of said gutter, means for supplying coolant to said chamber, and at least one nozzle mounted on said chamber, said nozzle having an outlet directed toward the inner open side of said gutter, whereby on turbine rotation coolant is forced by centrifugal force through said ducts into contact with said blade.

2. The gas turbine blade cooling apparatus as defined in claim 1, said connection means comprising an annular manifold attached to said hub adjacent said rim between said receptacle and said radial connecting ducts, whereby said radial connecting ducts are supplied from said manifold.

3. The gas turbine blade cooling apparatus as defined in claim 2, said connection means further comprising transverse ducts adjacent the hub rim and located directly beneath the blade roots, said radial ducts extending radially from said transverse ducts and communicating therewith.

4. The gas turbine blade cooling apparatus as defined in claim 3, the inlet section of said radial ducts being constricted to form inlet flow orifices for control of quantity of coolant flow to the blade surfaces.

5. In a gas turbine having a shaft, a rotor mounted on said shaft, blades having blade roots secured to the periphery of said rotor, and a stator in juxtaposition with said rotor with stationary blades in proximity to said rotor blades, apparatus for cooling said rotor blades comprising a receptacle for coolant attached to the rotor adjacent the axis of rotor rotation, coolant supply ducts with terminal nozzles in the blade roots on the convex side of the rotor blades, radial connecting ducts extending through the periphery of said rim in communication with said coolant supply ducts, connection means attached to said rotor between said receptacle and said radial connecting ducts, means for supplying coolant to said receptacle, an inner ring in said stator for supporting said stator blades in juxtaposition to said rotor blades, tubes with terminal nozzles secured to and projecting through said ring from inside the ring space for projecting coolant into the stator blade space, and means for supplying coolant to said stator nozzles, at least two of said stator nozzles having a different diameter, whereby the degree of penetration of coolant flow into the stator blade space may be varied.

6. Gas turbine blade cooling apparatus as defined in claim 5 with said stator nozzles varying in diameter with one half having a smaller diameter than the other half.

7. Gas turbine blade cooling apparatus as defined in claim 6 with the diameter of each half of the stator nozzles being equal.

References Cited in the file of this patent

UNITED STATES PATENTS

| | | |
|---|---|---|
| 2,401,826 | Halford | June 11, 1946 |
| 2,406,473 | Palmatier | Aug. 27, 1946 |
| 2,416,389 | Heppner et al. | Feb. 25, 1947 |
| 2,532,721 | Kalitinsky et al. | Dec. 5, 1950 |
| 2,656,147 | Brownhill et al. | Oct. 20, 1953 |
| 2,670,912 | Lindsey et al. | Mar. 2, 1954 |
| 2,700,530 | Williams | Jan. 25, 1955 |

FOREIGN PATENTS

| | | |
|---|---|---|
| 475,711 | Germany | May 2, 1929 |
| 556,105 | Great Britain | Sept. 21, 1943 |